(12) United States Patent
Kristensen et al.

(10) Patent No.: US 8,739,695 B2
(45) Date of Patent: Jun. 3, 2014

(54) METHOD FOR FEEDING EGGS TO AN EGG BREAKING APPARATUS AND AN EGG BREAKING APPARATUS

(75) Inventors: Jens Kristian Kristensen, Odense (DK); Jan Holm Holst, Odense (DK); Martin Sørensen, Odense (DK)

(73) Assignee: Sanovo Engineering A/S, Odense NV (DK)

( * ) Notice: Subject to any disclaimer, the term of this patent is extended or adjusted under 35 U.S.C. 154(b) by 1228 days.

(21) Appl. No.: 12/278,282

(22) PCT Filed: Feb. 23, 2006

(86) PCT No.: PCT/DK2006/000106
§ 371 (c)(1),
(2), (4) Date: Dec. 12, 2008

(87) PCT Pub. No.: WO2007/095943
PCT Pub. Date: Aug. 30, 2007

(65) Prior Publication Data
US 2009/0217826 A1 Sep. 3, 2009

(51) Int. Cl.
*A47J 43/14* (2006.01)

(52) U.S. Cl.
USPC ............ 99/500; 99/497; 99/498; 99/499; 426/299; 198/433

(58) Field of Classification Search
USPC ........................... 99/500, 571, 568
See application file for complete search history.

(56) References Cited

U.S. PATENT DOCUMENTS

| | | | | |
|---|---|---|---|---|
| 630,805 | A | * | 8/1899 | Decker .................. 198/629 |
| 2,524,844 | A | * | 10/1950 | Smith ..................... 99/509 |
| 3,190,328 | A | * | 6/1965 | Twedt et al. ............. 99/577 |
| 3,370,691 | A | * | 2/1968 | Mosterd ................. 198/433 |
| 3,542,101 | A | | 11/1970 | Klint |

(Continued)

*Primary Examiner* — Gene Kim
*Assistant Examiner* — John E Simms, Jr.
(74) *Attorney, Agent, or Firm* — Sughrue Mion, PLLC (57) ABSTRACT

The invention relates to an egg breaking apparatus and a method of feeding eggs to an egg breaking apparatus, where eggs are fed to a plurality of egg breaking devices by means of a feed conveyor. Each egg breaking device receives one egg at a time and all egg breaking devices are mounted on a common drive conveyor, where the egg breaking devices are moved in relation to the feed conveyor in a first direction following a substantially vertical first axis at the area of the feed conveyor. The feed conveyor feeds eggs to the egg breaking devices along a substantially horizontal second axis. When near a position at the feed conveyor, the egg breaking devices are tilted about a third axis, which is substantially perpendicular to the first and second axes, in a second direction substantially opposite to said first direction. In a preferred embodiment the egg breaking devices are brought back into their initial, untilted position before or during a period of emptying of the broken egg and after the yolk has left the eggshell upon breaking of the egg, the egg breaking device is preferably tilted downwards in relation to the initial, untilted position, preferably to an angle of approximately 45 degrees below a horizontal plane. During a period of emptying of the egg the egg breaking device may be moved in an uneven pattern, e.g. serrated or corrugated, pattern, causing a vibration of the egg breaking device. It is also preferred, that the egg breaking device performs a second tilting at the end of the period of emptying of the egg. Guiding rail may be provided for guiding the egg breaking devices along a particular track, each egg breaking device preferably being provided with a projecting member capable of interacting with the guiding rail(s).

16 Claims, 5 Drawing Sheets

(56) References Cited

U.S. PATENT DOCUMENTS

| | | | |
|---|---|---|---|
| 4,321,864 A * | 3/1982 | Willsey | 99/500 |
| 5,085,139 A * | 2/1992 | Pellegrinelli | 99/500 |
| 5,460,083 A * | 10/1995 | Hutchinson et al. | 99/484 |
| 5,613,429 A * | 3/1997 | Pettazzi | 99/500 |
| 5,617,782 A * | 4/1997 | Thomas | 99/500 |
| 5,628,246 A * | 5/1997 | Kristensen | 99/500 |
| 5,858,434 A * | 1/1999 | Thomas | 426/299 |

\* cited by examiner

METHOD FOR FEEDING EGGS TO AN EGG BREAKING APPARATUS AND AN EGG BREAKING APPARATUS

The present invention relates to a method of feeding eggs to an egg breaking apparatus, where eggs are fed to a plurality of egg breaking devices by means of a feed conveyor, each egg breaking device receiving one egg at a time and all egg breaking devices being mounted on a common drive conveyor, where the egg breaking devices are moved in relation to the feed conveyor in a first direction following a substantially vertical first axis at the area of the feed conveyor, and where the feed conveyor feeds eggs to the egg breaking devices along a substantially horizontal second axis. The invention further relates to an apparatus having means for exercising such a method of feeding.

When breaking eggs for the purpose of extracting the contents thereof it is important that the eggs are not dropped and that the eggshells are not broken prematurely or in an inappropriate manner, which may for example happen if the egg is treated to roughly. In particular the feeding of eggs from a feeding conveyor to an egg breaking apparatus operating at high speed is problematic as the eggs may encounter impact loads when being caught at high speed by individual egg breaking devices of the egg breaking apparatus or may not be caught correctly.

It has been proposed to speed up the eggs to travel with substantially the same velocity as the egg breaking devices at the point of delivery, this velocity being approximately twice the velocity used in other parts of egg processing plants. This increase of velocity has been achieved by transferring the eggs from a first conveyor running at the normal processing velocity to a second conveyor running at twice that velocity. This, however, leads to relatively bulky feed conveyor designs with two successive feeding conveyors.

It is therefore the object of the invention to provide a method of feeding eggs to an egg breaking apparatus, where the risk of dropping, unintentional breaking and incorrect catching of the eggs is minimised without necessitating an increase of the proportions of the apparatus used.

This object is met with a method according to the invention, where, when in a position near the feed conveyor, the egg breaking devices are tilted about a third axis, which is substantially perpendicular to the first and second axes, in a second direction substantially opposite to said first direction.

The tilting of the egg breaking device causes a brief apparent decrease of its velocity, which not only decreases the impact loads encountered by the egg when transferred thereto but also enables a more controlled delivery as regards accuracy. Once transferred, the egg accelerates together with the egg breaking device to the velocity of the common drive conveyor and there is thus no need for a preceding acceleration of the eggs.

In an embodiment, the egg breaking devices are tilted with a velocity corresponding substantially to the difference between the velocity of the feed conveyor and the velocity of the common drive conveyor, meaning that the effective velocity of the egg breaking device corresponds substantially to that of the feed conveyor. It is, however, to be understood that the velocity of tilting may be less than said difference, meaning that the egg breaking devices would travel at an effective velocity above that of the feeder, but at least some of the advantages of the reduced difference of velocity would still be achieved.

The velocity of tilting may of cause be different for different portions of the egg breaking device and in such cases the proportional velocity stated above applies to the portion of the egg breaking device actually coming into contact with the egg at receipt thereof. In the most likely embodiments the part of the egg breaking device intended for holding the egg during breaking thereof is essentially plate shaped and when tilting such a plate shaped part the velocity of the edge furthest from the point of rotation will be bigger than the velocity of the rest of the plate, the velocity increasing with the distance from the point of rotation. As the edge furthest from the point of rotation will normal also be the one coming into contact with egg first, it is the velocity of this edge, which should fulfil the velocity conditions stated above.

To achieve the optimal use of the apparent decrease of velocity that the tilting of an egg breaking device is performed substantially simultaneously with the receipt of an egg from the feed conveyor, but the exact timing will depend on the design of the feed conveyor, the egg breaking device, the drive conveyor and the connection between these.

The actual breaking of the eggs may be performed with the egg breaking devices still in their tilted position, but with the aim of minimizing the risk of damaging the yolk membrane of the egg it is preferred that the egg breaking devices are brought back into their initial, untilted position. In particular, the bringing back may take place immediately upon receipt of the egg to thereby contribute to the acceleration of the egg.

The untilted position is, however, not optimal with regards to draining off all of the albumen and it therefore preferred that after the yolk has left the eggshell upon breaking of the egg, the egg breaking device is tilted downwards in relation to the initial, untilted position, preferably to an angle of approximately 45 degrees below a horizontal plane. The 45-degree angle has proven particularly well suited for achieving an optimal draining of the eggshell, but it is to be understood that other angles may also be employed with satisfactory result.

To further encourage the emptying of the eggshells it is advantageous that, during the period of emptying of an egg, the egg breaking device is vibrated. This may be achieved by moving the device itself or a bar on which it is mounted along an uneven, e.g. serrated or corrugated, surface, causing an alternating upwards and downwards movement of the egg breaking device. A similar effect may, however, also be achieved by inducing an oscillating rotating movement, where the egg breaking device is alternatingly turned upwards and downwards corresponding essentially to the tilting described above, though possibly with a smaller amplitude and a different velocity. In this way the contents of the egg are so to speak shaken out of the eggshell, but it is important to notice that the vibration should not take place until after the yolk has left the eggshell as the yolk membrane could otherwise be damaged.

At the end of the period of emptying of the egg the egg breaking device is preferably tilted once more to thereby break any strings of albumen still connected to the eggshell. By doing this, the amount of albumen remaining in the eggshell at discharge thereof is minimised. The secondary tilting is preferably performed at a velocity inflicting a jerk on the albumen, which is thus abruptly torn. In this way the yield may be increased by up to 3% in comparison with prior art egg breaking machines.

Even though the term "tilting" is used to designated both the initial and secondary inclination of the egg breaking device it is to be understood that both the velocity of movement, the amplitude and end positions need not be the same.

In the following examples of embodiments according to the invention will be described in further detail with reference to the accompanying drawing. In the drawing

Figure 1:
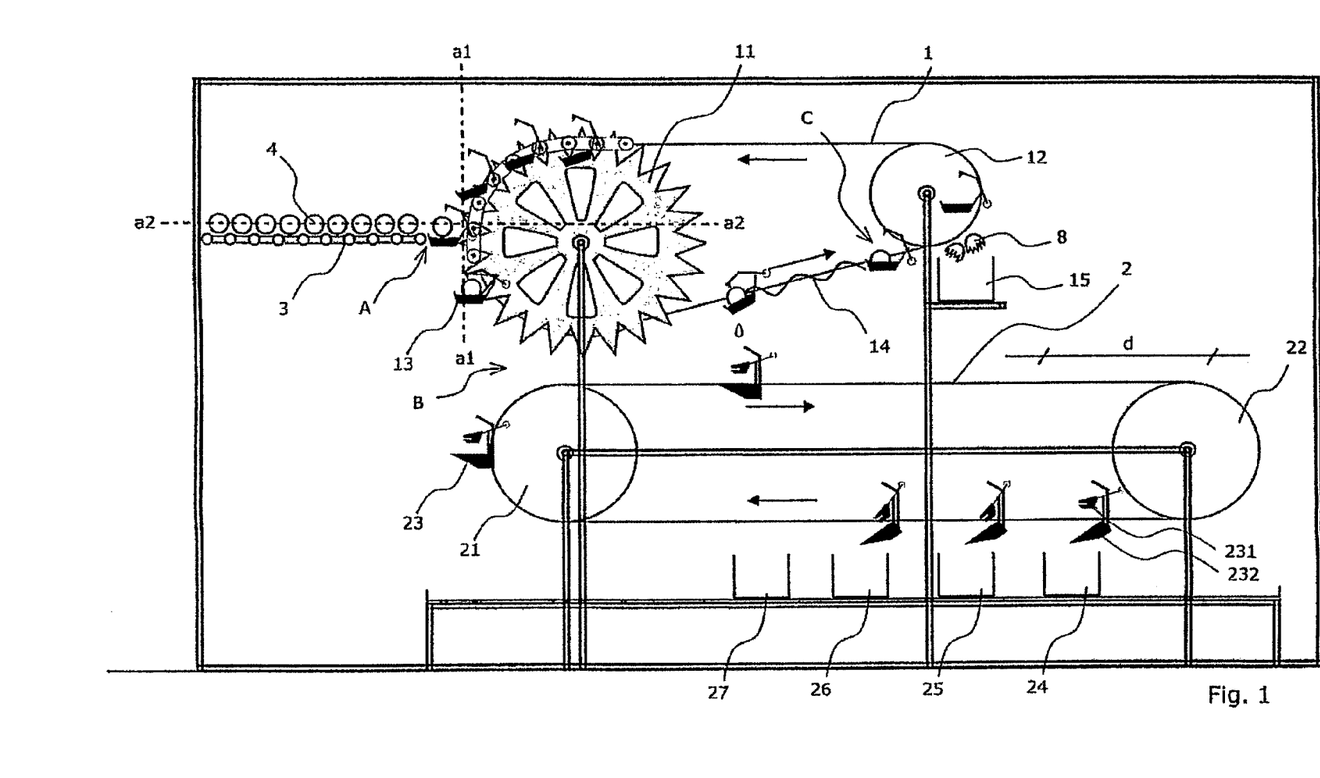
FIG. 1 depicts an egg breaking apparatus according to the invention.

An egg breaking apparatus according to the invention may be embodied as shown in FIG. 1. The apparatus shown comprises two separate chains 1, 2 mounted on toothed turning wheels 11,12,21,22, where the uppermost chain 1 carries a plurality of egg breaking devices 13 and the lowermost chain 2 carries a plurality of egg receiving devices 23, the chains serving as drive conveyors common to all of the egg breaking and receiving devices, respectively. FIG. 1 shows only a few egg breaking and receiving devices on the respective chains but it is to be understood that in practise the number of devices on each chain are larger such that they are evenly spaced with substantially the same mutual distance on both chains. Similarly, even though FIG. 1 shows only a single row of egg breaking and receiving devices it is to be understood that each of these devices may represent a column of devices extending perpendicularly to the plane of the drawing. Such columns are preferably mounted on horizontal bars stretching between two parallel chains, each column including for example eight or sixteen separate egg breaking or receiving devices. When using four chains instead of the two shown in FIG. 1, the number of turning wheels is of course also doubled.

A feed conveyor 3 carries eggs 4 towards the uppermost chain and delivers them to the egg breaking devices 13 at point A, where the egg breaking devices are moved essentially along a first vertical axis a1 and where the delivery of the eggs takes place substantially along a second horizontal axis a2.

The uppermost chain 1 is driven in a counter-clockwise direction and the lowermost chain 2 in a clockwise direction as indicated by the arrows, the velocity of the two chains being substantially identical. In this way each egg breaking device 13 will meet an egg receiving device 23 at point B and the pair will travel together until reaching the upper right turning wheel 12 as seen in the FIG. 1.

The actual breaking of the egg 4 takes place in the vicinity of point B and the contents of the egg are then drained from the eggshell into the egg receiving device 23 underneath the egg breaking device 13. As may be seen, the distance between the two chains 1,2 increases with the movement towards the second turning wheel 12 of the uppermost chain 1 causing a gradually increasing pull on the albumen and in particular on the chazala.

Figure 2:
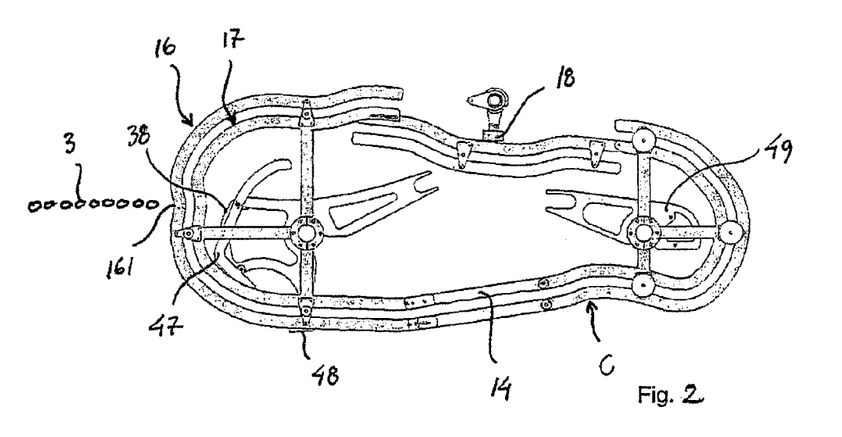
FIG. 2 shows the track followed by the egg breaking devices.

As may further be seen from FIG. 1 as well as from FIG. 2 the ascending portion of the track, where the distance between the two chains 1,2 increases as explained above, is equipped with a serrated or corrugated surface 14, along which horizontal mounting bars, on which the egg breaking devices 13 are mounted as described above, travels. This causes a vibration of the egg breaking devices and thus the opened eggshells, which vibration will encourage any remaining albumen to leave the eggshells. The mounting bars may be moved directly along the serrated or corrugated surface causing an alternating upwards and downwards movement thereof, or they might be provided with guiding arms as explained below running along the serrated or corrugated surface to thereby cause a rotation based vibration.

When reaching the upper right turning wheel 12 as seen in FIG. 1 the egg breaking device 13 travels upwards away from the egg receiving device 23, and the emptied eggshells 8 are discharged into the waste receptacle 15, from where they may be removed by means of for example a screw conveyor (not shown).

After passing the upper right turning wheel 12, the egg receiving devices 23 travels onwards along the chain 2 towards the turning wheel 22, the distance d between the turning wheels 12 and 22 of the two chain systems serving as an inspection section, where the contents of the egg receiving devices may be monitored manually or automatically.

When reaching the underside of the chain 2, the contents of the egg receiving devices are emptied into one or more product receptacles depending on the result of the inspection. In the embodiment shown the apparatus is equipped with four product receptacles; one 24 for receiving pure albumens, one 25 for receiving pure yolks, one 26 for receiving mixtures of albumen and yolk and one 27 for receiving otherwise contaminated or unacceptable eggs. For enabling the separate discharge of albumen and yolk each egg receiving device 23 is equipped with a yolk holder 231 and an albumen cup 232, which may be emptied independently.

As may be seen from FIG. 1, the uppermost chain 1 is considerably shorter than the lowermost chain 2, meaning that the number of egg breaking devices 13 is smaller than the number of egg receiving devices 23 and that for each process cycle different egg breaking and egg receiving devices will be paired when meeting at point B. Preferably the number of egg receiving devices is twice the number of egg breaking devices, meaning that only two specific egg receiving devices will receive the contents of eggs broken by any one of the egg breaking device. If, however, it is desired that only the same two devices should be paired during each process cycle the chain systems can be modified accordingly, for example by making the uppermost chain longer, possibly adding an extra turning wheel (not shown), or by adding a buffer (not shown) delaying the advancement of the egg breaking devices.

FIG. 2 shows the track followed by the egg breaking devices 13 in closer details. As may be seen the track deviates from that, which is native to a chain 1 guided about two spaced apart turning wheels 11,12 as shown in FIG. 1. This deviation is achieved by providing each of the egg breaking devices with projecting guiding arms 133,134 as may be seen in FIGS. 6 and 7 carrying guiding wheels 135,136, which runs on a system of rails 14,16,17 arranged at an appropriate distance from the native track of the chain and/or which comes into abutment against fixed parts (not shown) of the apparatus arranged on or in the vicinity of the rails.

In the embodiment shown the track is delimited by means of guiding rails 16,17 arranged two by two, but other embodiments where for example the breaking devices rest on solitary guiding rail under the influence of gravity may also be envisaged.

Figure 6:
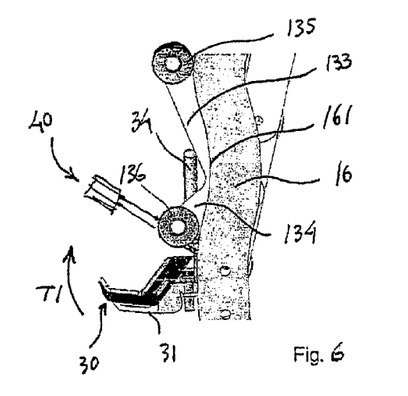
FIG. 6-11 shows the egg breaking device seen in a direction parallel to the third axis in different positions on the track.
Figure 7:
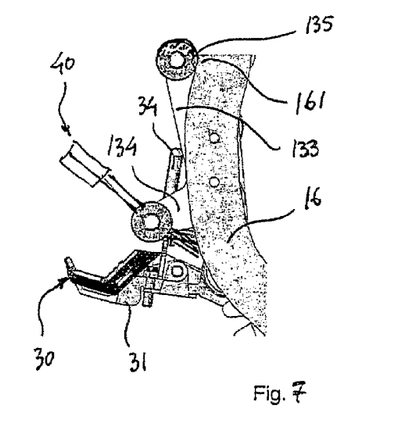

When passing the feed conveyor 3 the egg breaking device 13 is tilted upwards as indicated with the arrow T1 in FIG. 6 from the initial position to a tilted position shown in FIG. 7. The tilting of the egg breaking device is achieved by the arm 133 following the guiding rail 16 into the depression 161 as seen in FIG. 7. In the embodiment shown, the egg breaking device is tilted approximately 10 degrees upwards, but this angle may vary depending on different system requirements.

In the preferred embodiment, the tilting is performed as a rotation of the entire egg breaking device, but a separate part of the egg breaking device intended for receiving the egg may also be rotatable independently of the rest. Such an independent part should, however, preferably be connected to the rest of the egg breaking device in a manner allowing mounting, replacement etc. as one unit.

The egg breaking apparatus may of course be provided with additional means (not shown) for transferring the eggs from the feed conveyor 3 to the egg breaking device 13, such means for example comprising pins, wings, shovels or the like designed to push or lift the eggs off the feed conveyor and onto the egg breaking devices. Such means may be provided in connection with the feed conveyor 3, the common drive conveyor 1 or the egg breaking device 13.

The curves shown on the uppermost, substantially horizontal section of the guiding rails 16,17 are made for the purpose of repositioning the egg breaking devices before starting a new process cycle.

Figure 3:
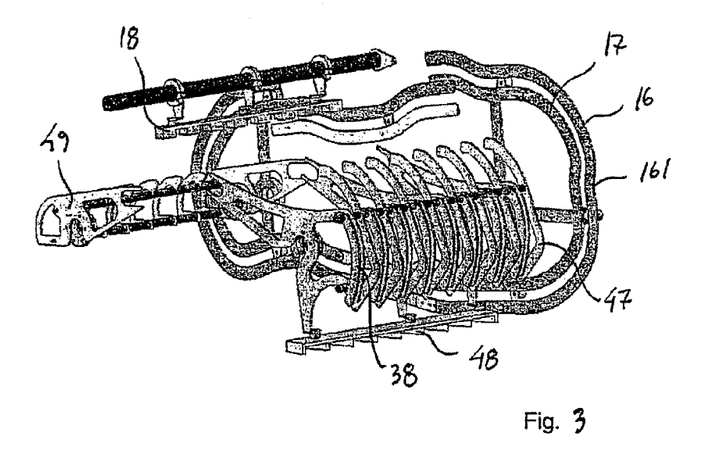
FIG. 3 shows a perspective representation of a system of guiding rails and abutment parts corresponding to the system shown from the side in FIG. 2.
Figure 4:
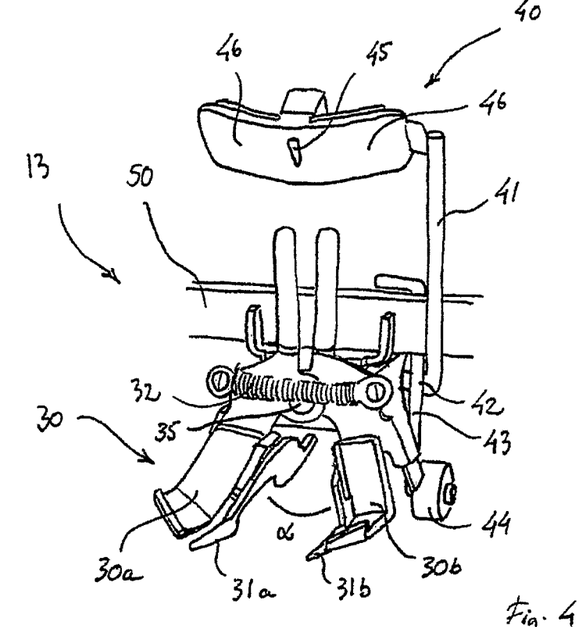
FIG. 4 shows the egg breaking device seen from the side facing the feed conveyor and in an open position.
Figure 5:
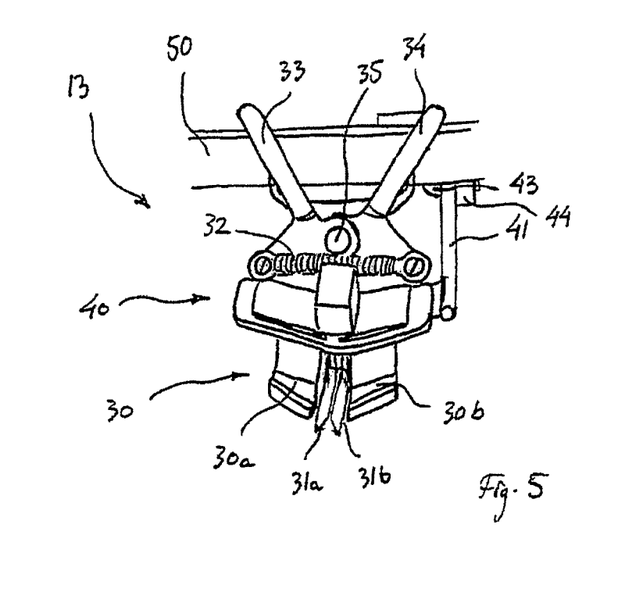
FIG. 5 is an illustration corresponding to the one in FIG. 4 but with the egg breaking device in a closed position.

FIGS. 4 and 5 show the egg breaking device 13 seen from the side facing the feed conveyor 3. As may be seen the egg breaking device, which comprises a lower holding part 30 and an upper retaining part 40, is mounted on a horizontal bar 50 as mentioned above. The retaining part is moveable in a substantially vertical direction in relation to the holding part to enable it to be moved from the open position shown in FIG. 4 to the closed position shown in FIG. 5. In the embodiment shown, the retaining part is mounted on an arm 41, which may be rotated about a point of suspension 42 by means of another arm 43 coming into abutment against a fixed part 47 of the frame of the apparatus, which may be seen in FIGS. 2 and 3, the latter arm preferably being provided with an abutment wheel 44. It is, however, to be understood that the retaining part may for example also be mounted on a substantially vertical arm (not shown), which is moved along its length axis by means of hydraulic or spring actuated means.

In the embodiment shown, the holding part 30 is split in two 30a, 30b to give room for a knife part 31 between them, said knife part been moveable together with the holding part and the rest of the egg breaking device during tilting thereof and further being moveable independently of the holding part to enable breaking of the egg shell as will be explained below.

When passing the feed conveyor 3 for receiving an egg, the holding part 30 is in a closed position as shown in FIG. 5 and the retaining device 40 is in its upper position as shown in FIG. 4. In the initial position the holding part 30 is substantially horizontal, possibly with a slight positive inclination as shown in FIG. 6 and it is then tilted upwards to the position shown in FIG. 7 as shown with the arrow T1, the tilting corresponding to approximately 10 degrees. The tilting is achieved by means of the guiding arm 133 following the track of the guiding rail 16 into the depression 161 as explained above, but may also be achieve by means of a hydraulic cylinder (not shown) or the like capable of effecting both a pull and a pressure on the egg breaking device. Alternatively, the device may be subject to a continuous pull exercised by means of for example a simple coil spring (not shown), which pull may be overcome by means of the pressure of a hydraulic means or vice versa.

Figure 8:
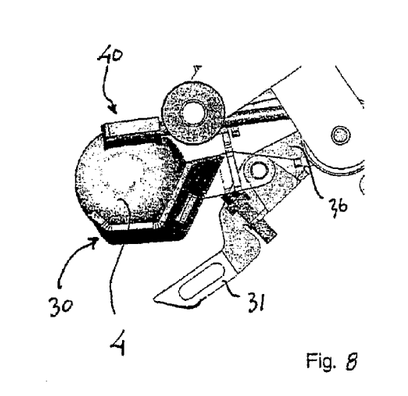
Figure 9:
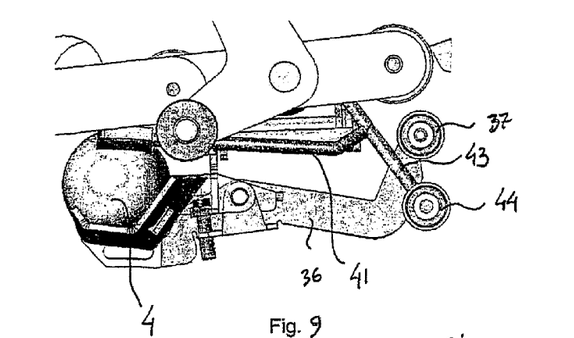

To keep the egg 4 in place during the subsequent breaking thereof the retaining part 40 is brought down to the position shown in FIGS. 5 and 8, whereby it comes into abutment against the upper side of the eggshell. The actual breaking is achieved by lowering a knife portion 31 to the position shown in FIG. 8 and then taking it rapidly back to the position shown in FIG. 9 to thereby penetrate the eggshell. The movement of the knife is initiated by means of an arm 36 carrying an abutment wheel 37 as shown in FIG. 9 coming into abutment against fixed parts 38 of the apparatus, which may be seen in FIGS. 2 and 3.

In principal, the apparatus may function without a retaining part 40, but the presence thereof is much preferred, as it contributes considerably to minimising the risk of the egg being incorrectly broken or dropped.

The retaining part 40 is provided with a projection 45 on its side facing the egg. The purpose of this projection is to direct the crack in the eggshell caused by the knife portion 31, but the egg breaking device may function without the projection.

Once the crack in the egg shell has been created, the two halves of the holding part 30 is moved away from each other to the position shown in FIG. 4 by forcing a pair of levers 33,34 towards each other. The knife part 31 is split in two 31a, 31b in the same way as the holding part 30 as may be seen from FIGS. 4 and 5 and these two knife members 31a, 31b are moved to the side together with the two members 30a, 30b of the holding part, the knife members functioning as detaining edges preventing the two halves of the eggshell from sliding off the now inclined portions of the holding part. The movement away from each other of the two holding and knife members is preferably achieved by bringing the levers into contact with fixed parts 48 of the apparatus, which may be seen in FIGS. 2 and 3. During opening the two wing-like side portions 46 of the retaining part 40 acts as retaining and guiding means for the eggshell. At the beginning of a new process cycle, the levers are moved back, away from each other by coming into contact with a fixed part 18 of the apparatus, which may too be seen in FIGS. 2 and 3.

In the embodiment shown, the two halves are of the holding part 30 interconnected by a spring 32 forcing them towards each other, but which is not in itself strong enough to move them. In the position shown in FIG. 4 the spring it located above the point of connection 35 of the to halves and thus helps keeping the levers 33,34 together and the holding part 30 in its open position. When the two levers are brought into the position shown in FIG. 5 the spring 32 passed the point of connection 35 and will consequently pull the two halves of the holding part 30 towards their closed position. The spring may thus be said to always contribute to keeping the two halves of the holding part in their current position.

The angle of opening α between the two knife portions 31a, 31b and thus between the two halves of the eggshell is preferably approximately 45 degrees, but a wide range of opening angles will serve the purpose as long as the yolk of the egg may pass through the opening and the egg breaking device is able to hold securely on to the eggshell.

The holding and retaining parts 30, 40 are kept in these positions until the entire contents of the egg have been drained as explained above.

The small differences in the positioning of the holding part 30 of the egg breaking devices shown in FIGS. 6, 8 and 9 are only to be seen as one of number of different embodiments. The important thing is that the knife part should be arranged substantially horizontally during the breaking, opening and initial emptying of egg to thereby minimise the risk of the knifes cutting trough the yolk membrane either in connection with the breaking of the shell or when the yolk leaves the eggshell. Keeping the egg breaking device in a substantially horizontal position in stead of a tilted position may be said to correspond to holding a shaving razor in an oblique angle in stead of perpendicular to the skin, which will prevent unintentional cutting.

Figure 10:
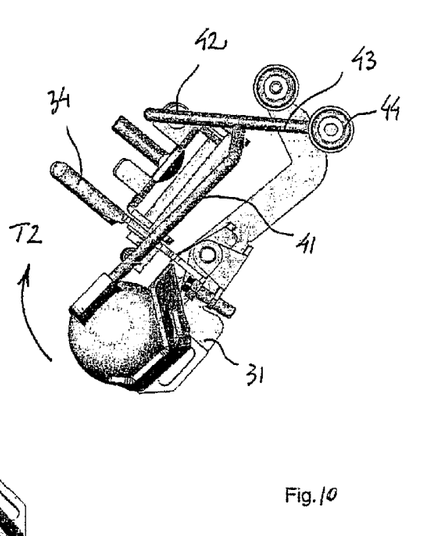

To enable the best possible draining of the albumen remaining in the eggshell once the yolk has been left it, the egg breaking device 13 is preferably moved to the position shown in FIG. 10, where it is located in a downwards angle of approximately 45 degrees in relation to its initial position.

This movement of the egg breaking device may be performed suddenly or gradually during the emptying of the egg and the angle of the end position may be varied according to different parameters such as the viscosity of the albumen of the eggs being processed.

As described above a vibration of the egg breaking device 13 and thus the opened eggshell may be employed to encourage a larger part of the albumen to leave the eggshell and an alternating upwards and downwards movement of the egg breaking device by turning may serve this purpose. Such a turning should preferably have a substantially smaller amplitude than the tilting described above, but it is equally preferred that the turning should be performed with the same means as those used for the initial as well as the finishing tilting.

When reaching the end of the ascending section of the track, i.e. point C in FIGS. 1 and 2, the egg breaking device is tilted once more as indicated by the arrow T2 in FIG. 10 essentially as described above in connection with the receipt of the egg. This tilting has the purpose of tearing any strings of albumen still attached to the eggshell and it is to be understood that the velocity of movement of the egg breaking device as well as the amplitude and end positions need not be the same as by the initial tilting. On the contrary, it may be preferred that this second tilting happens at a greater velocity than the first tilting, as the purpose is here a breaking or tearing of the albumen, whereas the first tilting is among others intended to prevent breaking of the eggshell.

Figure 11:
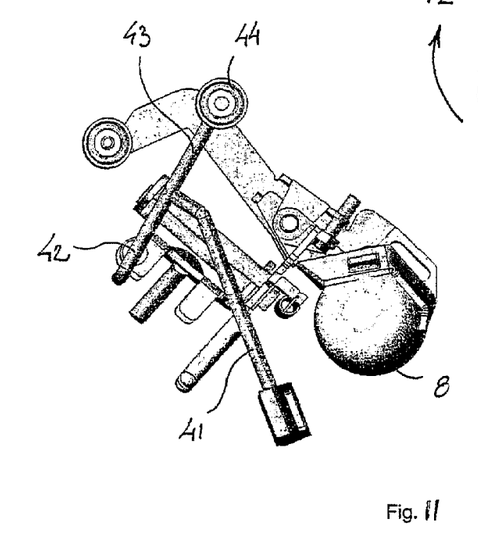

To release the emptied eggshell, the retaining part is brought back into the position shown in FIG. 4 by contact with the fixed part 49 of the apparatus, which may be seen in FIGS. 2 and 3, and the egg breaking device is turned to the position shown in FIG. 11. The eggshell then falls from the egg breaking device under the influence of gravity, and no additional means are needed for discharging the eggshell.

It is to be understood, that the preferred embodiments of the invention described in the above are not to be seen as limiting the scope of the invention. Rather, a person skilled in the art will be able to conceive a number of modifications and combinations of the features described above, which will fall under the scope of invention as define by the claims.

The invention claimed is:

1. A method of feeding eggs to an egg breaking apparatus, where eggs are fed to a plurality of egg breaking devices by means of a feed conveyor, each egg breaking device receiving one egg at a time and all egg breaking devices being mounted on a common drive conveyor, where the egg breaking devices are moved in relation to the feed conveyor in a first direction following a substantially vertical first axis at the area of the feed conveyor, and where the feed conveyor feeds eggs to the egg breaking devices along a substantially horizontal second axis, characterized in that, when near a position at the feed conveyor, the egg breaking devices are tilted about a third axis, which is substantially perpendicular to the first and second axes, in a second direction substantially opposite to said first direction wherein the tilting of the egg breaking device causes vertical movement briefly decreasing the velocity, to reduce an impact load encountered by the egg when transferred to the egg breaking device.

2. A method according to claim 1, characterized in that the egg breaking devices are tilted with a velocity corresponding substantially to the difference between the velocity of the feed conveyor and the velocity of the common drive conveyor.

3. A method according to claim 1, characterized in that the tilting of an egg breaking device is performed substantially simultaneously with the receipt of an egg from the feed conveyor.

4. A method according to claim 1, wherein a shell of each egg is broken by the respective egg breaking device and contents of the egg including yolk and albumen are then drained from shell during a period of emptying the egg, and that the egg breaking devices are brought back into their initial, untilted position before or during the period of emptying of the broken egg.

5. A method according to claim 1, wherein a shell of each egg is broken by the respective egg breaking device and contents of the egg including yolk and albumen are then drained from the shell during a period of emptying the egg, and that after the yolk has left the eggshell upon breaking of the egg, the egg breaking device is tilted downwards in relation to the initial, untilted position, preferably to an angle of approximately 45 degrees below a horizontal plane.

6. A method according to claim 1, wherein a shell of each egg is broken by the respective egg breaking device and contents of the egg including yolk and albumen are then drained from the shell during a period of emptying the egg, and that during the period of emptying of the egg the egg breaking device is moved in an uneven pattern, causing a vibration of the egg breaking device.

7. A method according to claim 1, wherein a shell of each egg is broken by the respective egg breaking device and contents of the egg including yolk and albumen are then drained from the shell during a period of emptying the egg, and wherein the egg breaking device performs a second tilting at the end of the period of emptying of the egg.

8. A method according to claim 7, characterized in that the second tilting of the egg breaking device is performed at a velocity inflicting a jerk on any possible part of the albumen still connected to the eggshell.

9. An egg breaking apparatus, comprising
a plurality of egg breaking devices, each capable of receiving one egg at a time and all being mounted on a common drive conveyor,
a feed conveyor for feeding eggs to the egg breaking devices,
a plurality of egg receiving device, each capable of receiving the contents of only one egg in each process cycle,
where the egg breaking devices are movable in relation to the feed conveyor in a first direction along a substantially vertical first axis, and
where the feed conveyor conveys the eggs to the egg breaking devices along a substantially horizontal second axis,
characterized in that, when near a position opposite the feed conveyor, the egg breaking device is tilted about a third axis, which is substantially perpendicular to the first and second axes, in a second direction substantially opposite to said first direction wherein the tilting of the egg breaking device causes vertical movement briefly decreasing the velocity, to reduce an impact load encountered by the egg when transferred to the egg breaking device.

10. An apparatus according to claim 9, characterized in that each egg breaking device is pivotably mounted and provided with a projection, such as an arm, which engages a guide track fixed in the apparatus frame during movement the egg breaking device along the common drive conveyor.

11. An apparatus according to claim 9, characterized in that the tilting of the egg breaking apparatus is reversible.

12. An apparatus according to claim 9, characterized in that it comprises at least one guiding rail for guiding the egg breaking devices along a particular track, each egg breaking device preferably being provided with a projecting member capable of interacting with the guiding rail(s).

13. An apparatus according to claim 12, characterized in that the common drive conveyor comprises chains to which the egg breaking devices are mounted, directly or indirectly, and that the chains are provided with projecting members capable of interacting with the guiding rail(s).

14. An apparatus according to claim 9, characterized in that it comprises an uneven, e.g. serrated or corrugated, surface over which the egg breaking devices are moved for causing a vibration of the egg breaking devices.

15. A method according to claim 6, where the egg breaking device is moved in a serrated or corrugated pattern.

16. An apparatus according to claim 10, where the projection on each egg breaking device is an arm.

\* \* \* \* \*